United States Patent
Lee

(10) Patent No.: US 9,904,388 B2
(45) Date of Patent: Feb. 27, 2018

(54) TOUCH PANEL TO MINIMIZE SIGNAL DISTORTION AND DISPLAY APPARATUS INCLUDING THE SAME

(71) Applicant: G2TOUCH Co., LTD., Seongnam (KR)

(72) Inventor: Sung Ho Lee, Hwaseong (KR)

(73) Assignee: G2TOUCH CO., LTD., Seongnam (KR)

( * ) Notice: Subject to any disclaimer, the term of this patent is extended or adjusted under 35 U.S.C. 154(b) by 200 days.

(21) Appl. No.: 14/816,933

(22) Filed: Aug. 3, 2015

(65) Prior Publication Data
US 2016/0062527 A1    Mar. 3, 2016

(30) Foreign Application Priority Data
Aug. 28, 2014   (KR) .................. 10-2014-0113091

(51) Int. Cl.
*G06F 3/041*  (2006.01)
*G06F 3/044*  (2006.01)

(52) U.S. Cl.
CPC ............ *G06F 3/0412* (2013.01); *G06F 3/044* (2013.01); *G06F 2203/04103* (2013.01)

(58) Field of Classification Search
CPC ...... G06F 3/041; G06F 3/0412; G06F 3/0416; G06F 3/044; G06F 2203/04111; G06F 2203/04113; G09G 3/36–3/3696
See application file for complete search history.

(56) References Cited

U.S. PATENT DOCUMENTS

| | | | |
|---|---|---|---|
| 2007/0164455 A1 | 7/2007 | Matsuura | |
| 2011/0074729 A1* | 3/2011 | Im | G06F 3/0412 345/174 |
| 2012/0092273 A1 | 4/2012 | Lyon et al. | |
| 2014/0084992 A1 | 3/2014 | Chen et al. | |
| 2014/0168154 A1* | 6/2014 | Wang | G06F 3/0412 345/174 |
| 2014/0232691 A1 | 8/2014 | Lee | |
| 2015/0378474 A1* | 12/2015 | Liu | G06F 3/0412 345/174 |

FOREIGN PATENT DOCUMENTS

| | | | |
|---|---|---|---|
| CN | 102667684 A | 12/2012 | |
| CN | 103164076 A | 6/2013 | |
| EP | 2 515 210 A2 | 10/2012 | |
| EP | 2 602 697 A2 | 6/2013 | |
| TW | 201413514 A | 1/2014 | |
| WO | WO 2013048195 A2 * | 4/2013 | ............. G06F 3/044 |

OTHER PUBLICATIONS

Extended European Search Report for European Application No. 15002538.5 dated Feb. 8, 2016.

* cited by examiner

*Primary Examiner* — Nathan Danielsen

(57) ABSTRACT

Disclosed herein is a touch panel disposed on a TFT substrate 120 included in a display panel 130 to detect a touch by a touch input means 2, an entire area of the TFT substrate 120 is provided with TFT signal lines 121 including gate signal lines 121*a* and source signal lines 121*b* and is divided into a display black-matrix area DBA without pixels and a display active area DAA provided with the pixels to display an image, and the touch pads 111 and the touch signal lines 112 are patterned only at an upper position of an area corresponding to the DAA not to be vertically opposite to the TFT signal line 121.

2 Claims, 16 Drawing Sheets

<PRIOR ART>

<PRIOR ART>

<PRIOR ART>

<PRIOR ART>

<PRIOR ART>

<PRIOR ART>

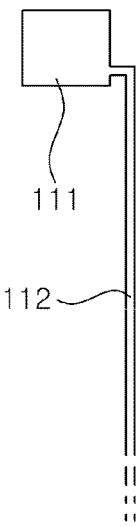
FIG. 16A
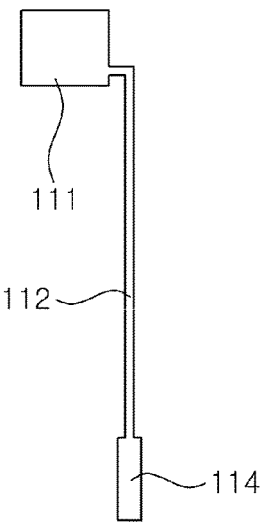
FIG. 16B
FIG. 17
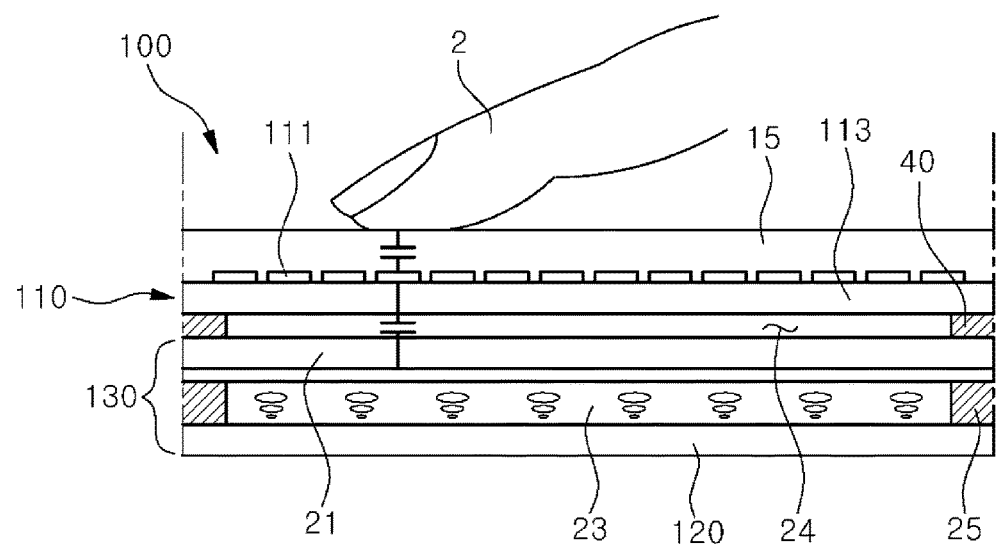

TOUCH PANEL TO MINIMIZE SIGNAL DISTORTION AND DISPLAY APPARATUS INCLUDING THE SAME

CROSS-REFERENCE TO RELATED APPLICATIONS

This application claims priority from and the benefit of Korean Patent Application No. 10-2014-0113091, filed on Aug. 28, 2014, which is hereby incorporated by reference for all purposes as if fully set forth herein.

BACKGROUND OF THE INVENTION

Field of the Invention

The present invention relates to a touch panel to minimize a signal distortion and a display apparatus including the same, and more particularly, to a touch panel to minimize a signal distortion due to an electrical effect between each of the TFT signal lines of a TFT substrate and each of the touch signal lines of a touch panel by patterning the TFT signal lines and the touch signal lines in an optimal structure in which the TFT signal lines and the touch signal lines are not vertically opposite to each other in a state in which the touch panel is mounted on a display panel including the TFT substrate, and a display apparatus including the same.

Discussion of the Background

FIG. 1 illustrates a configuration of a general display apparatus. Referring to FIG. 1, in a general display apparatus 1, a touch panel 10 detecting a touch by a touch input means 2 is mounted on a display panel 20 outputting an image.

Describing in more detail, the display panel 20 has a structure in which a TFT substrate 30 is disposed at a lower part of the display panel 20 and a liquid crystal layer 23 is formed by sealing a liquid crystal between a color filter 21 disposed at an upper part of the display panel and the TFT substrate 30. To seal the liquid crystal, outer portions of the TFT substrate 30 and the color filter 21 are bonded to each other by a sealant 25. Further, although not illustrated, polarizing plates are not only attached to the upper and lower parts of the display panel 20, but back light units are also installed at the upper and lower parts of the display panel 20.

Further, as illustrated, the touch panel 10 is disposed on the display panel 20. In the touch panel 10, linear touch pads 11 are patterned on the upper surface of the touch substrate 16 and a passivation layer 15 disposed over the touch pads to cover the touch pads 11 from the outside.

The touch panel 10 is bonded to edge parts of the display panel 20 by an adhesive member 40 such as a double adhesive tape (DAT). In this case, an air gap 24 is formed between the adhesive member 40 and the touch panel 20.

Meanwhile, FIG. 2 illustrates a configuration of a general touch panel 10. Referring to FIG. 2, in the general touch panel 10, the plurality of touch pads 11 which senses touches by the touch input means 2 to output touch signals and touch signal lines 12 applying the touch signals of each of the touch pads 11 to a touch drive IC 13 are patterned on the touch substrate 16.

With the disposition structure of the touch pads 11 and the touch signal lines 12 which are patterned, the touch panel 10 is divided into a touch active area TAA (portion shown by a dotted line) in which the touch pads are disposed to be able to sense the touch by the touch input means 2 and a touch black-matrix area TBA (portion shown by a shade) in which the touch pads 11 are not disposed not to be able to sense the touch.

In this configuration, the touch pads 11 are patterned on the touch substrate 16 in a form in which the plurality of touch pads 11 are aligned within the TAA at a predetermined distance so as to provide a uniform touch input and the touch signal lines 12 are formed on the touch substrate 160 while extending toward a direction in which the touch drive IC 13 is disposed to electrically interconnect between each touch pad 11 and the touch drive IC 13.

FIG. 2 illustrates that as the touch drive IC 13 is disposed at the lower part based on a position where each touch pad 11 is disposed, each touch signal line 12 is drawn out from sides of the touch pads 11 and extends downward while being bent. However, when the touch drive IC 13 is disposed at the side or the upper part of the touch pad 11, each touch signal line 12 is bent laterally or upward to extend toward the touch drive IC.

Meanwhile, FIG. 3 illustrates a detailed configuration of a unit pixel which is formed the general TFT substrate 30 and FIG. 4 schematically illustrates a configuration of the TFT substrate 30.

Referring to FIG. 3, the TFT substrate 30 is vertically and horizontally provided with gate signal lines 31a and source signal lines 31b.

A gate electrode 38 of a TFT 36 is connected to the gate signal line 31a to be applied with a scanning signal and a source electrode 34 and a drain electrode thereof are each connected to the source signal line 31b and a pixel electrode line 39. Further, a substrate 33 of the TFT 36 forms a channel between the source electrode 34 and the drain electrode 35 to apply an image signal to the liquid crystal layer 23. As illustrated, a common electrode line 37 is formed within a pixel, in parallel with the pixel electrode line 39.

Therefore, when the TFT 36 is operated to apply the image signal to the pixel electrode line 39, a horizontal electric field is substantially generated between the common electrode line 37 and the pixel electrode line 39, and as a result a predetermined screen is displayed while liquid crystal molecules of the liquid crystal layer 23 moves on a plane.

Further, as illustrated in FIG. 4, in the TFT substrate 30, the TFT signal line 31 including the gate signal lines 31a and the source signal lines 31b is disposed on the substrate 33 and the entire area is divided into a display black-matrix area DBA (portion shown by a shade) without a pixel and a display active area DAA (portion inside a shade) in which the pixel is disposed to display an image. Further, one side of the substrate 33 is provided with a display drive IC 32 which generates a gate signal and a source signal for driving each pixel to display an image on the display panel 20.

In addition, the gate signal lines 31a and the source signal lines 31b which extend in a direction in which the display drive IC 122 is disposed are each patterned within the DBA to apply the gate signal or the source signal output from the display drive IC 32 to the TFT 36, thereby applying the gate signal or the source signal, which is sourced from the display drive IC 32, to each pixel.

Further, as illustrated in FIGS. 1 and 5, the touch panel 10 is disposed on the TFT substrate 30 in a form in which the touch panel 10 and the TFT substrate may vertically overlap with each other, and therefore each area of the TBA and TAA of the touch panel 10 and each area of the DBA and the DAA of the TFT substrate 30 may overlap with each other.

Here, FIG. 6 illustrates a state in which some of the touch pads 11a, 11b, and 11c and some of the touch signal lines 12a, 12b, and 12c are disposed to overlap with the DBA of the TFT substrate 30 while the existing touch panel 10 is seated on the TFT substrate 30.

Referring to FIGS. 1 and 6, the touch pads 11 and the touch signal lines 12 of the touch panel 11 are formed on a TFT upper surface adhesive. If it is assumed that the TFT upper surface adhesive is the color filter 21 of a glass material and a vertical thickness of the color filter 21 is 0.5 mm, the plurality of gate signal lines 31a and each touch pad 11 which are illustrated in FIG. 6 are vertically spaced apart from each other by 0.5 mm and are more spaced apart from each other by a thickness of the adhesive member 40.

In this case, a touch pad 11a illustrated at the left of FIG. 5 is disposed to be vertically opposite to the gate signal line 31a which is disposed in the DBA present at the left of the TFT substrate 30. In this case, when a pitch of the gate signal line 31a is 20 μm and the touch pad 11a has a thickness of 200 μm, the corresponding touch pad 11a is vertically opposite to 10 gate signal lines 31a within the DBA.

Further, the touch pad 11b and the touch signal line 12a which are illustrated at the right of FIG. 6 are disposed in the DBA in which the gate signal line 31a is disposed. If it is assumed that a width of the touch signal line 12a is 100 μm, one touch signal line 12a is vertically opposite to 5 gate signal lines 31b. In addition, the touch pad 11c and the touch signal line 12b which are illustrated at the lower part of FIG. 6 are vertically opposite to the source signal line 31b while being disposed in the DBA in which the source signal line 31b is disposed.

As such, when each of the touch pads 11a, 11b, and 11c, and the touch signal lines 12a and 12b of the touch panel 10 are vertically opposite to TFT signal lines 121 such as the gate signal line 31a and the source signal line 31b while being disposed in the DBA of the TFT substrate 120 in which the gate signal line 31a and the source signal line 31b are disposed, the gate signal line 31a and the source signal line 31b sequentially turns on/off the gate electrode and the source electrode by a time sharing method, and therefore as illustrated in FIG. 7, an electrical effect of a voltage applied depending on the turn on/off driving of the TFT signal line 31 including the gate signal line 31a and the source signal line 31b is applied to the touch pads 11a, 11b, and 11c and the touch signal lines 12a and 12b, such that the sensed or transferred touch signals may be coupled to be distorted or may be mixed with a noise signal.

RELATED ART DOCUMENT

Patent Document (Patent Document 1) Korean Patent Laid-Open Publication No. 2013-0124821 (Nov. 15, 2013) entitled "Liquid Crystal Display and Driving Method Thereof"

SUMMARY OF THE INVENTION

An object of the present invention is to provide a touch panel to minimize a signal distortion and a display apparatus including the same capable of minimizing a signal distortion phenomenon due to an electrical effect between each of the TFT signal lines of a TFT substrate and each of the touch signal lines of a touch panel, by patterning the touch signal lines of the touch panel only at an upper position of a display active area DAA in which the TFT signal lines of the TFT substrate are not disposed or by patterning the touch signal lines while inclining the touch signal lines, which are disposed in a display black-matrix area DBA in which the TFT signal lines of the TFT substrate are disposed, at a predetermined angle or bending the touch signal lines in a zigzag form to intersect the TFT signal lines with the touch signal lines without allowing the TFT signal lines and the touch signal lines to be vertically opposite to each other, in a state in which the touch panel is mounted on the upper part of the display panel including the TFT substrate.

As described above, a characteristic configuration of present invention is as follows for achieving the above objects of the present invention and specific effects of the present invention.

According to an exemplary embodiment of the present invention, there is provided a touch panel disposed on a TFT substrate 120 included in a display panel 130 to detect a touch by a touch input means 2, the touch panel including: a touch substrate 113 configured to be horizontally disposed on the TFT substrate 120; a plurality of touch pads 111 configured to be patterned on the touch substrate 113 to sense the touch so as to output touch signals; and touch signal lines 112 configured to be patterned on the touch substrate 113 in a form in which one end of the touch signal lines is connected to each touch pad 111 and the other end thereof is connected to a touch drive IC and apply the touch signals of each touch pad 111 to the touch drive IC, wherein an entire area of the TFT substrate 120 is provided with TFT signal lines 121 including gate signal lines 121a and source signal lines 121b and is divided into a display black-matrix area DBA without pixels and a display active area DAA provided with the pixels to display an image, and the touch pads 111 and the touch signal lines 112 are patterned only at an upper position of an area corresponding to the DAA not to be vertically opposite to the TFT signal line 121.

The plurality of touch pads 111 may be patterned within the DAA area of the TFT substrate 120 in a form in which a plurality of columns and a plurality of rows are spaced from each other at a predetermined distance and each touch signal line 112 may be patterned within the DAA area in a form in which the touch signal lines 112 extend in a direction in which the touch drive IC is disposed from each touch pad 111.

Each touch signal line 112 of two touch pad columns C1 and C8 which are disposed at the outermost side among all the columns of the touch pads 111 may be drawn out inwardly from each touch pad 111 toward a center of the touch panel 110 and thus extend in a direction in which the touch drive IC is disposed and each touch signal line 112 of each of the touch pad columns C2 to C7 disposed between the two touch pad columns C1 and C8 at the outermost side may be drawn out by being divided into both directions within the corresponding touch pad column to extend in the direction in which the touch drive IC is disposed and each touch signal 112 may be patterned in a form in which the number of touch signal lines 112 drawn out in one direction within the corresponding touch pad column is increased and the number of touch signal lines 112 drawn out in the other direction is reduced, from the outermost touch pad column C1 which is any one of the two touch pad columns C1 and C8 at the outermost side toward the other outermost touch pad column C8 to make a distance between each of the touch pad columns C1 to C8 equal.

According to another exemplary embodiment of the present invention, there is provided a touch panel disposed on a TFT substrate 120 included in a display panel 130 to detect a touch by a touch input means 2, the touch panel including: a touch substrate 113 configured to be horizontally disposed on the TFT substrate 120; a plurality of touch pads 111 configured to be patterned on the touch substrate 113 to sense the touch so as to output touch signals; and touch signal lines 112 configured to be patterned on the touch substrate 113 in a form in which one end of the touch signal lines is connected to each touch pad 111 and the other end thereof is connected to a touch drive IC and apply the touch signals of each touch pad 111 to the touch drive IC, wherein the touch signal lines 112 are drawn out laterally from each touch pad 111 and thus extend in a direction in which the driver IC is disposed and among the touch signal lines 112, some of the touch signal lines 112a disposed within a display black matrix area DBA which is provided with TFT signal lines 121 including gate signal lines 121a and source signal lines 121b of the TFT substrate 120 and does not have pixels extend toward the touch drive IC in a form in which the touch signal lines 112a intersect with the TFT signal lines 121 while being inclined at a predetermined angle θ1 with respect to the TFT signal lines 121 or a zigzag form bent plural times with respect to the TFT signal lines 121 so as not to be vertically opposite to the TFT signal lines 121.

The touch pad 111 and the touch signal line 112 may be integrally formed without a joint as one sheet of mask made of a transparent conductor of an indium tin oxide material.

One side of an end position of the touch signal line 112 on the touch substrate 113 may be connected to one touch signal line and the other side thereof may be provided with a bonding pad 114 which is individually connected to one of a plurality of connection terminals disposed in the touch drive IC to input the transferred touch signal to the touch drive IC and the bonding pad 114 may be integrally formed without a joint as one sheet of mask made of a transparent conductor of an indium tin oxide material, together with the touch pad 111 and the touch signal line 112.

According to still another exemplary embodiment of the present invention, there is provided a display apparatus outputting a screen while detecting a touch by a touch input means 2, the display apparatus including: a display panel 130 configured to have a TFT substrate 120 which has an entire area provided with TFT signal lines 121 including gate signal lines 121a and source signal lines 121b and is divided into a display black-matrix area DBA without pixels and a display active area DAA provided with the pixels to display an image and output a predetermined screen depending on a signal input to the TFT substrate 120; and a touch panel 110 configured to include a touch substrate 113 horizontally disposed on the TFT substrate 120, a plurality of touch pads 111 patterned on the touch substrate 113 to sense the touch so as to output touch signals, and touch signal lines 112 patterned on the touch substrate 113 in a form in which one end of the touch signal lines is connected to each touch pad 111 and the other end thereof is connected to a touch drive IC and applying the touch signals of each touch pad 111 to the touch drive IC, wherein the touch signal lines 112 and the touch pads 111 are patterned only at an upper position of an area corresponding to the DAA of the TFT substrate 120 not to be vertically opposite to the TFT signal line 121.

According to yet another exemplary embodiment of the present invention, there is provided a display apparatus outputting a screen while detecting a touch by a touch input means 2, the display apparatus including: a display panel 130 configured to have a TFT substrate 120 which has an entire area provided with TFT signal lines 121 including gate signal lines 121a and source signal lines 121b and is divided into a display black-matrix area DBA without pixels and a display active area DAA provided with the pixels to display an image and output a predetermined screen depending on a signal input to the TFT substrate 120; and a touch panel 110 configured to include a touch substrate 113 horizontally disposed on the TFT substrate 120, a plurality of touch pads 111 patterned on the touch substrate 113 to sense the touch so as to output touch signals, and touch signal lines 112 patterned on the touch substrate 113 in a form in which one end of the touch signal lines is connected to each touch pad 111 and the other end thereof is connected to a touch drive IC and applying the touch signals of each touch pad 111 to the touch drive IC, wherein the touch signal lines 112 are drawn out laterally from each touch pad 111 to extend in a direction in which the drive IC is disposed and among the touch signal lines 112, some of the touch signal lines 112a disposed within the DBA of the TFT substrate 120 are patterned while extending toward the touch drive IC in a form in which the touch signal lines 112a intersect with the TFT signal lines 121 while being inclined at a predetermined angle θ1 with respect to the TFT signal lines 121 or a zigzag form bent plural times with respect to the TFT signal lines 121 so as not to be vertically opposite to the TFT signal lines 121.

According to still yet another exemplary embodiment of the present invention, there is provided a display apparatus outputting a screen while detecting a touch by a touch input means 2, the display apparatus including: a display panel 130 configured to have a TFT substrate 120 which has an entire area provided with TFT signal lines 121 including gate signal lines 121a and source signal lines 121b and is divided into a display black-matrix area DBA without pixels and a display active area DAA provided with the pixels to display an image and output a predetermined screen depending on a signal input to the TFT substrate 120; and a touch panel 110 configured to include a touch substrate 113 horizontally disposed on the TFT substrate 120, a plurality of touch pads 111 patterned on the touch substrate 113 to sense the touch so as to output touch signals, and touch signal lines 112 patterned on the touch substrate 113 in a form in which one end of the touch signal lines is connected to each touch pad 111 and the other end thereof is connected to a touch drive IC and applying the touch signals of each touch pad 111 to the touch drive IC, wherein among the touch signal lines 112, some of the touch signal lines 112a are disposed on the DBA of the TFT substrate 120 and the TFT signal lines 121 patterned within the DBA are patterned while extending toward the touch drive IC in a form in which the TFT signal lines 121 intersect with the touch signal lines 112a while being inclined at a predetermined angle θ2 with respect to the touch signal lines 112a or a zigzag form bent plural times with respect to the touch signal lines 112a so as not to be vertically opposite to the touch signal lines 112.

The touch pad 111 and the touch signal line 112 may be integrally formed without a joint as one sheet of mask made of a transparent conductor of an indium tin oxide material.

One side of an end position of the touch signal line 112 on the touch substrate 113 may be connected to one touch signal line and the other side thereof may be provided with a bonding pad 114 which is individually connected to one of a plurality of connection terminals disposed in the touch drive IC to input the transferred touch signal to the touch drive IC, and the bonding pad 114 may be integrally formed without a joint as one sheet of mask made of a transparent conductor of an indium tin oxide material, together with the touch pad 111 and the touch signal line 112.

BRIEF DESCRIPTION OF THE DRAWINGS

FIGS. 16A and 16B are diagrams schematically illustrating a configuration in which the touch pad, the touch signal line, and a bonding pad according to the exemplary embodiment of the present invention are formed in one mask form.

FIG. 17 is a side cross-sectional view of a configuration of a display apparatus according to an exemplary embodiment of the present invention.

DETAILED DESCRIPTION OF THE ILLUSTRATED EMBODIMENTS

The foregoing objects, features, and advantages of the present invention will be clearer from the following detailed description. Hereinafter, exemplary embodiments of the present invention will be described in detail with reference to the accompanying drawings.

Figure 1:
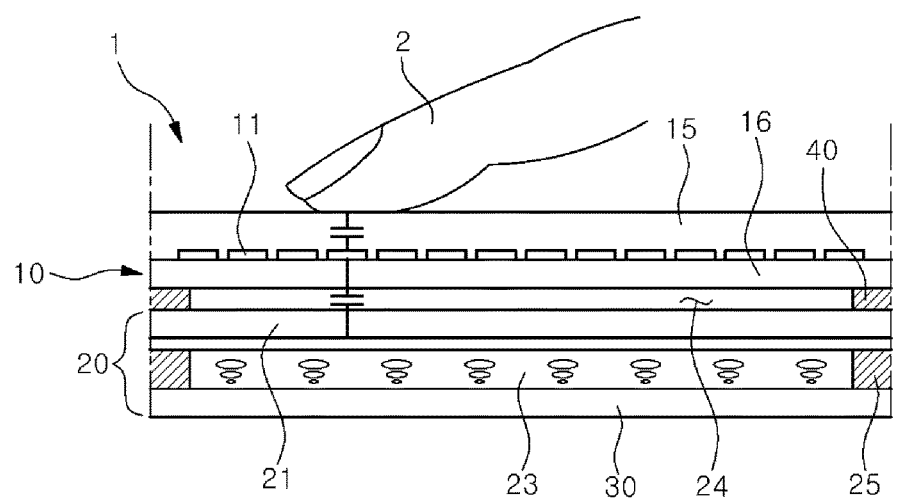
FIG. 1 is a side cross-sectional view illustrating a configuration of a general display apparatus.
Figure 2:
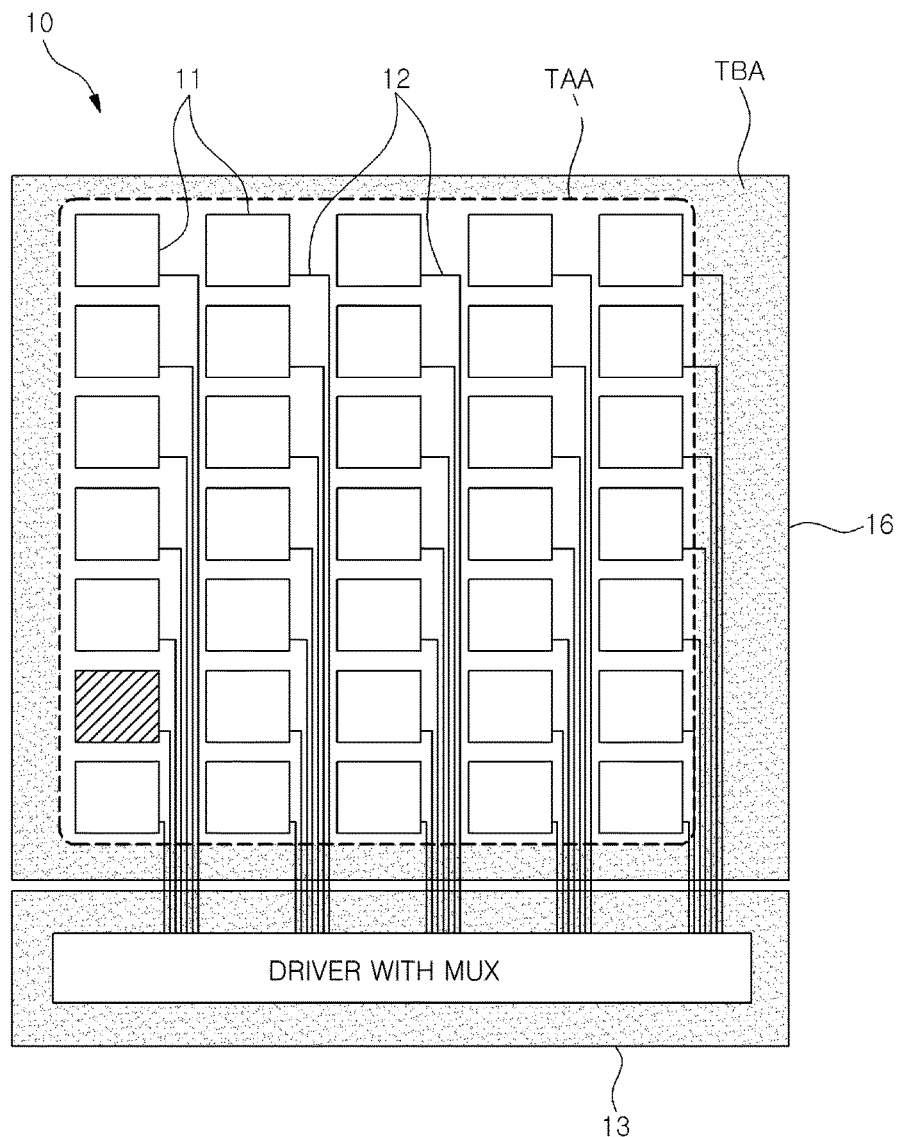
FIG. 2 is a diagram schematically illustrating a configuration of a general touch panel.
Figure 3:
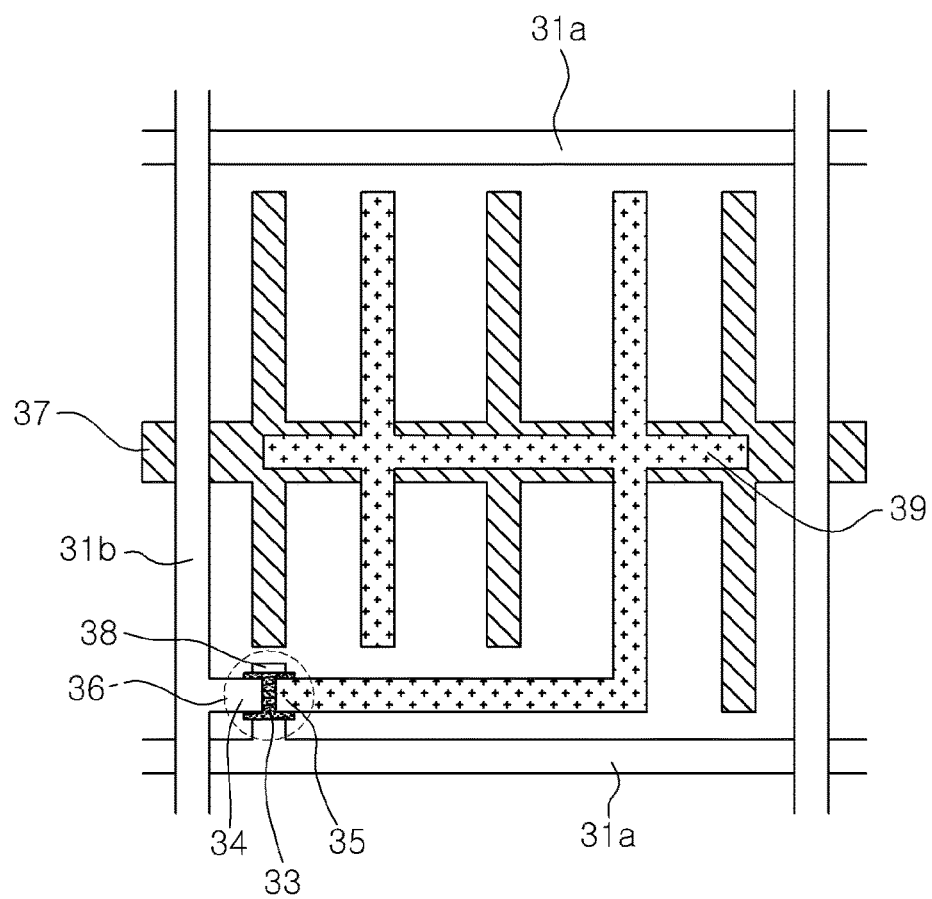
FIG. 3 is a diagram schematically illustrating a detailed construction of a unit pixel of a general TFT substrate.
Figure 4:
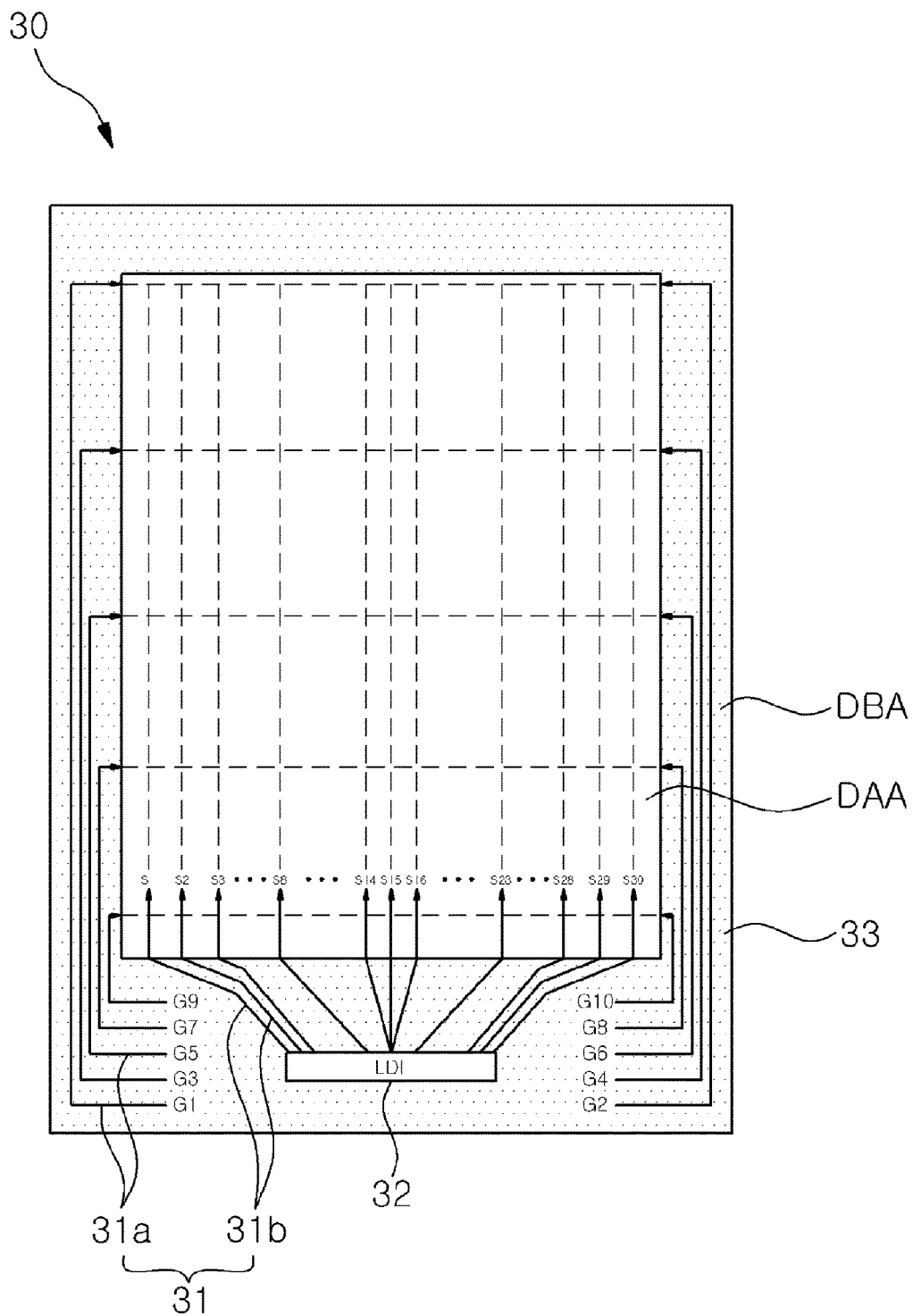
FIG. 4 is a diagram schematically illustrating the configuration of the general TFT substrate.
Figure 5:
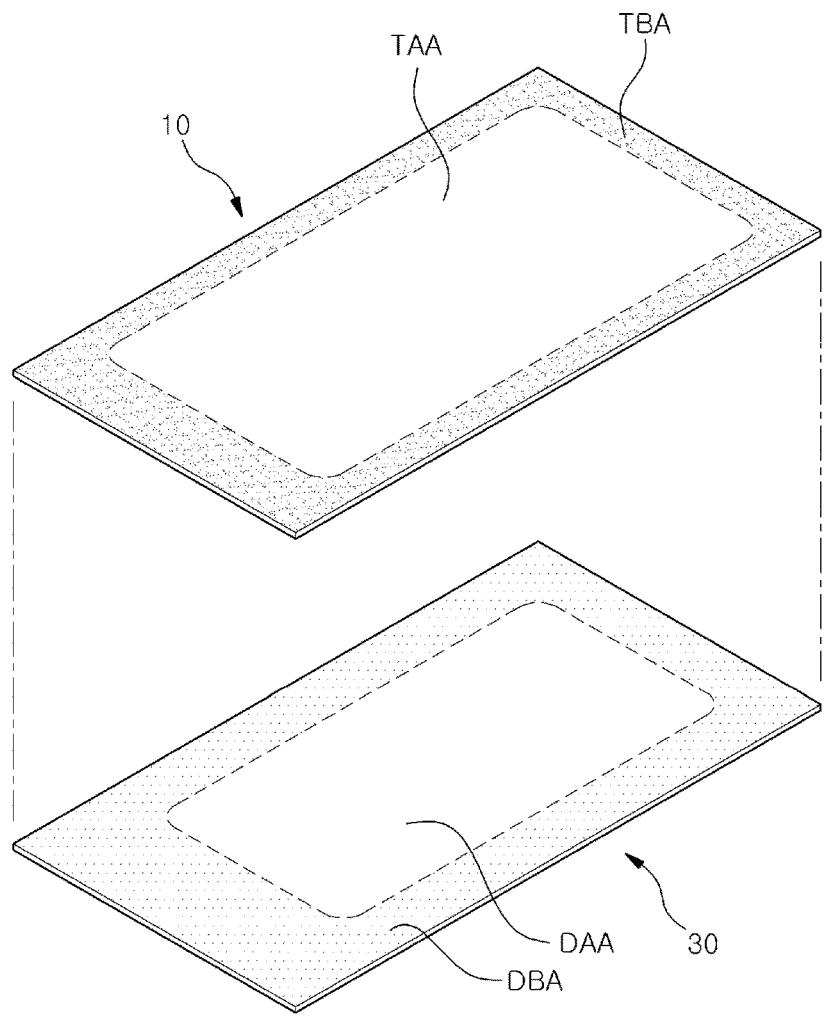
FIG. 5 is a perspective view illustrating a configuration in which the general touch panel is seated on the TFT substrate.
Figure 6:
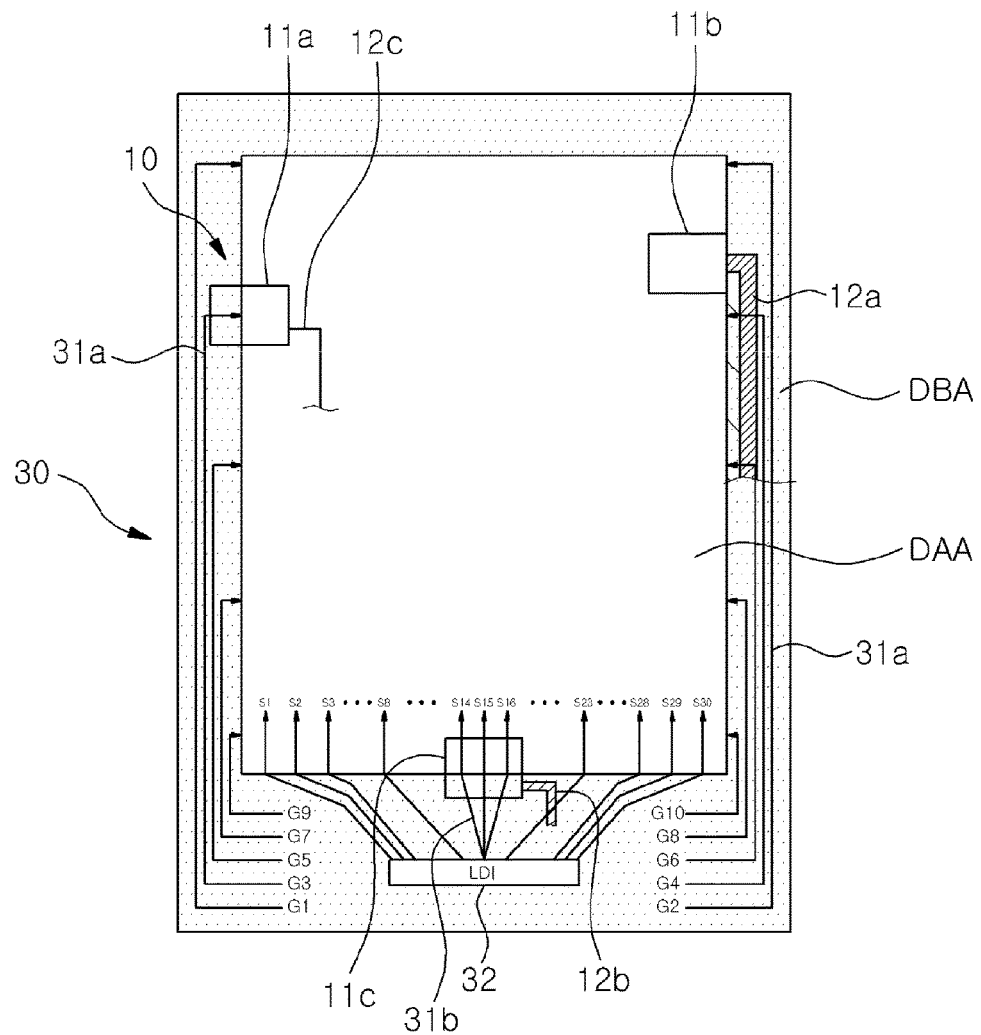
FIGS. 6, 7A and 7B are diagrams illustrating a state in which a touch pad and a touch signal line are vertically opposite to a TFT signal line while the existing touch panel is seated on the TFT substrate.
Figure 7A:
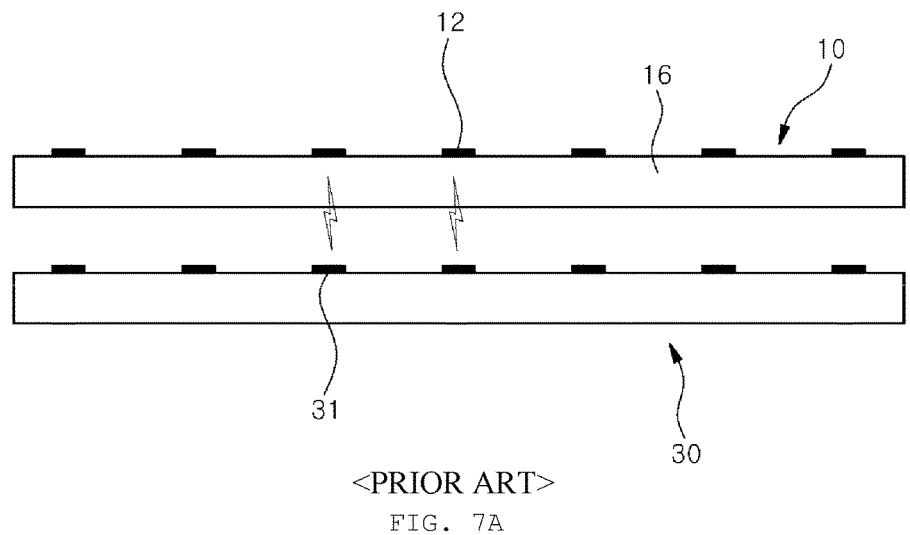
Figure 7B:
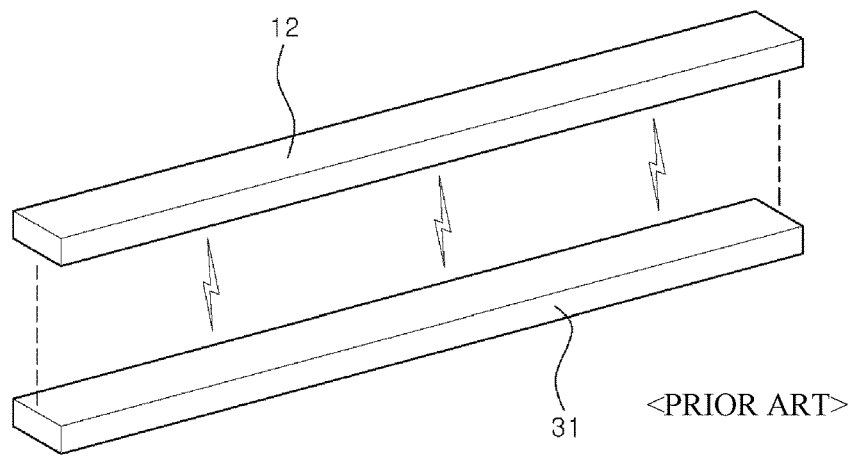

Prior to describing the exemplary embodiments of the present invention, terms to be described below are defined as follows. The term 'opposing' to be described below means that as a touch panel 110 is seated on a TFT substrate 120, a touch signal line 112 and a TFT signal line 121 each extend while being patterned and extend in the same direction while facing each other. Describing in more detail with reference to FIGS. 7 and 17, the term 'opposing' means that the touch signal lines 112 of the touch panel 110 and the TFT signal lines 121 of the TFT substrate 120 each extend while being patterned on substrates 113 and 120, and in this case, as the touch panel 110 is seated on the TFT substrate 120, any touch signal line 112 extends in the same direction as any TFT signal line 121 and upper and lower positions of each of them are disposed on vertical lines which are opposite to each other. That is, the opposing means the case in which the direction extending in the horizontal direction on the same vertical line is the same and each of the signal lines 121 and 112 may be affected by an electrical effect while vertically overlapping with each other along the extending length direction.

Further, 'being disposed in an area' to be described below is to be construed as including a meaning that each of the signal lines 121 and 112 is disposed in a horizontal area which is directly disposed within a specifically defined area and a meaning that each of the signal lines 121 and 112 is disposed in a vertical area which is disposed at an upper part of the corresponding area.

Further, a display apparatus 100 to minimize a signal distortion phenomenon according to an exemplary embodiment of the present invention is a display apparatus in which the signal line 121 of the TFT substrate 120 and the touch pad 111 and the touch signal line 112 of the touch panel 110 are patterned in an optimal structure in which the TFT signal line of the TFT substrate 120 and the touch pad 111 and the touch signal line of the touch panel 110 are not vertically opposite to each other in a state in which the touch panel 110 is mounted on a display panel 130 including the TFT substrate 120 to minimize the signal distortion phenomenon due to an electrical effect therebetween and is configured to include the touch panel 110 and the TFT substrate 120.

The display apparatus 100 has a structure in which the touch panel 110 detecting a touch by a touch input means 2 is mounted on the display panel 130 including the TFT substrate 120 for controlling screen driving.

Here, as long as the display panel 130 is an electronic screen display apparatus which may include an LCD to perform the predetermined screen driving, any display panel may be applied. For example, the display panel 130 may be an AMOLED or a PDP. Generally, in the case of the AMOLED or the PDP, a liquid crystal or a common electrode is not used, but exceptionally, when the common electrode is not used, a common electrode capacitor Cvcom is formed between the touch pad 111 and the TFT substrate 120.

Further, in the case of the display panel 130 in which the liquid crystal is not used, a color filter may be often unnecessary. For example, in the case of the AMOLED, the color filter is not used, but a display apparatus may be configured by bonding a protective glass or a protective film to the TFT substrate 120, instead of the color filter.

The protective glass or the protective film is configured of a single layer or the same kind or different kinds of multi layer. In this case, the touch pad 111 may also be formed on an upper surface of the protective glass or the protective film. The touch pad 111 may be formed on an uppermost layer or a lowermost layer of the protective film or the protective glass and may also be formed between layers in the case of the multilayer.

When the protective glass or the protective film is bonded to the upper surface of the TFT substrate 120, a light transmitting adhesive is used between the TFT substrate 120 and the protective film (or protective glass) to bond TFT substrate 120 to the protective film. As the light transmitting adhesive, an optically clear adhesive (OCA), transmitting silicon, etc., may be used.

Here, a configuration and an operation principle of the display panel 130 are described in a background art of the present specification. The detailed technical configuration thereof is a technical configuration which is well known in the technical field to which the present invention pertains and the present invention is based on main contents of a disposition structure between the touch panel 110 and the TFT substrate 120 and therefore the detailed technical description of the display panel 130 is omitted and the configuration of the touch panel and the TFT substrate 120 will be described in detail.

First, the display apparatus 100 according to the exemplary embodiment of the present invention may use various schemes of disposing each of the signal lines 121 and 112 and the touch pad 111 so that the TFT signal line 121 of the TFT substrate 120 and the touch pad 111 and the touch signal line 112 of the touch panel 110 are not vertically opposite to each other. Hereinafter, the exemplary embodiments of the present invention will be separately described based on the method of disposing each of the signal lines 121 and 112 and the touch pad 111.

First, in the touch panel 110 according to the exemplary embodiment of the present invention, the touch pad 111 and the touch signal line 112 are patterned in the area in which the TFT signal line 121 of the TFT substrate 120 is not disposed and thus each of the signal lines 121 and 112 and the touch pad 111 may be provided so that they are not opposite to each other.

Figure 10:
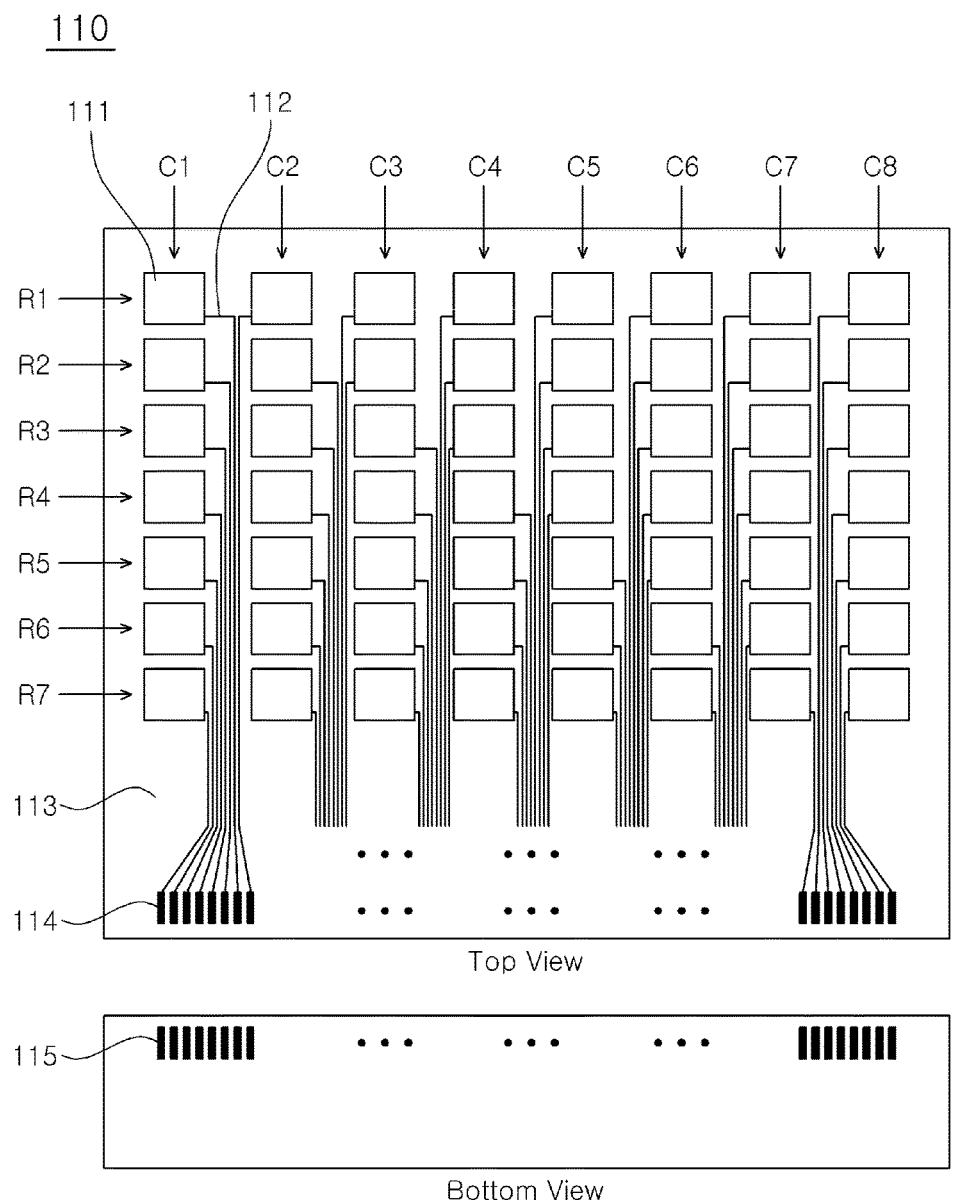
FIG. 10 is a diagram schematically illustrating the state in which the touch pads are patterned only at the DAA of the TFT substrate in a state in which a distance between the respective touch pads according to the exemplary embodiment of the present invention is equal.

To this end, in the touch panel 110, a plurality of touch pads 111 sense a touch generated at the time of an approach of the touch input means 2 such as a finger to the surface to output touch signals and the touch signal lines 112 applying the touch signal of each touch pad 111 to a touch drive IC are patterned on the touch substrate 113 (see FIG. 10).

Figure 8:
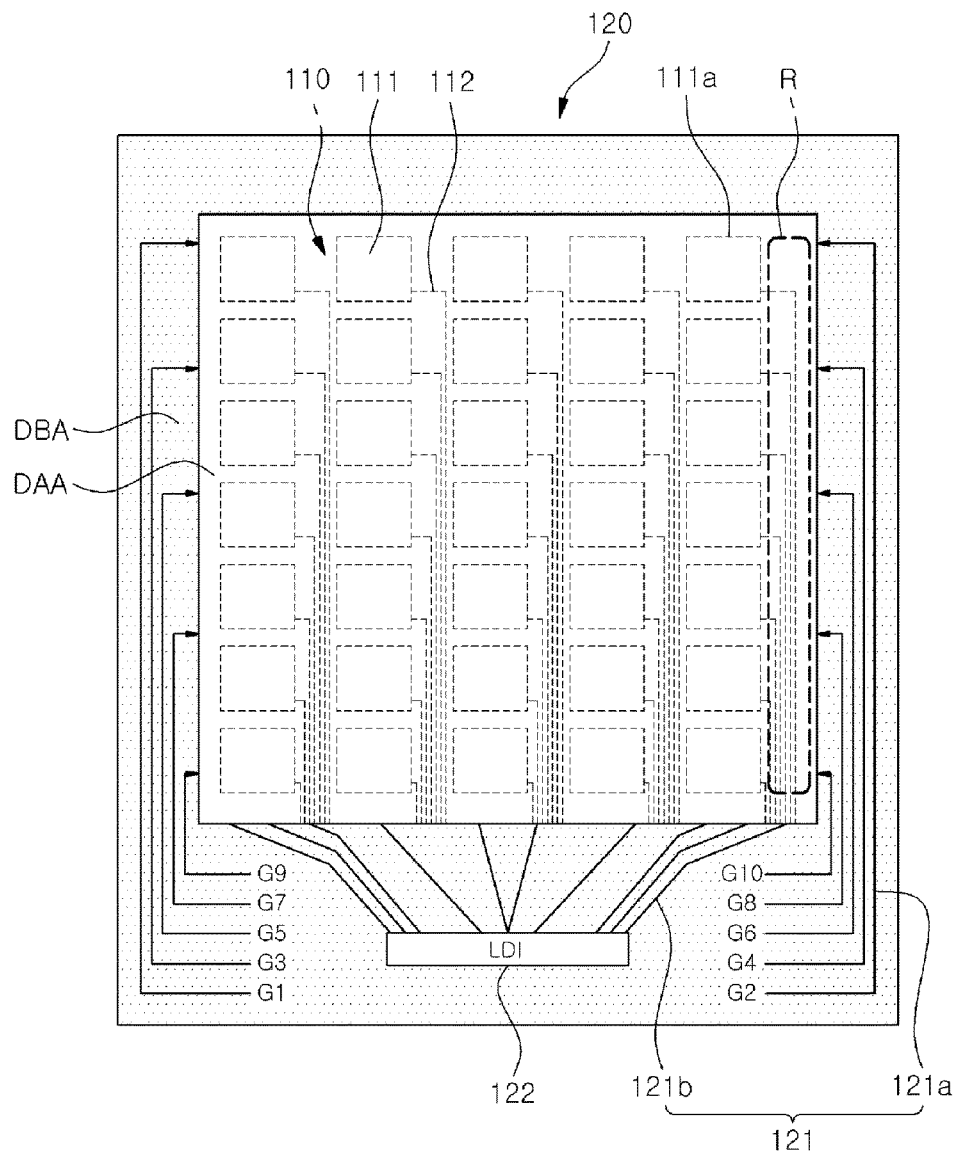
FIGS. 8 and 9 are diagrams schematically illustrating a state in which a touch panel according to an exemplary embodiment of the present invention is patterned only at a DAA of a TFT substrate.

In this case, as illustrated in FIG. 8, among a display black-matrix area DBA in which the TFT signal line 121 including gate signal lines 121a and source signal lines 121b of the TFT substrate 120 is disposed and does not have a pixel and a display active area DAA in which the pixel is disposed to display an image, the touch pad 111 and the touch signal line 112 may be patterned only at an upper position of an area corresponding to the DAA. That is, the touch pad 111 and the touch signal line 112 are placed on the position except the DBA in which the gate signal lines 121a and the source signal lines 121b are disposed and the touch pad 111 and the touch signal lines 112 are locally patterned only on the DAA area in which the TFT signal lines 121 are not disposed.

As such, the touch pad 11 and the touch signal line 112 of the touch panel 110 and the TFT signal line 121 of the TFT substrate 120 are disposed in different area and thus are not vertically opposite to each other, thereby preventing a signal distortion phenomenon due to the electrical effect therebetween.

Here, FIG. 8 illustrates that the gate signal lines 121a G1 to G10 sourced from the display drive IC 122 are wired to the left and right of the TFT substrate 120, odd-numbered gate signal lines 121a are disposed at the left of the TFT substrate 120, and even-numbered gate signal lines 121a are disposed at the right thereof, but the exemplary embodiment of the present invention is not limited thereto. Therefore, all the gate signal lines 121a may be only disposed in any one direction of the left or the right and even-numbered and odd-numbered gate signal lines 121a may also be disposed at any of the left or the right of the TFT substrate 120. The gate signal lines 121a are connected to the gate electrodes which are connected to pixels in the TFT substrate 120 to drive the gate electrodes by a time sharing method.

FIG. 8 illustrates the display panel 130 having a resolution of 10×10, which is only one example. The display panel 130 according to the exemplary embodiment of the present invention may be a display apparatus having a shape in which a width is long, like a resolution of 1024×768 or a display apparatus having a shape in which a length is long, like a resolution of 768×1024 without being limited to a specific resolution but the display panel may have a circular shape like a clock or a star shape without any limitation of a shape.

In addition, as illustrated in FIG. 8, the touch signal lines 112 of the touch panel 10 are drawn out in the right direction of each touch pad 111 on the DAA area of the TFT substrate 120 and may extend downward while being bent toward the touch drive IC disposed at the lower portion. In this case, since all the touch signal lines 112 extend by being drawn out from only the right direction of each touch pad 111, as illustrated in FIG. 8, a circumference of a right end of the touch panel 110 needs to have a space R in which the touch signal lines 112 which are signal-connected to the rightmost touch pad 111a are drawn in the right direction to extend downward.

However, a difference between the touch area of the circumference of the left end of the touch panel and the touch area of the circumference of the right end thereof occurs due to the secured space R, and as a result a phenomenon that the uniform touch input is limited may occur.

Figure 9:
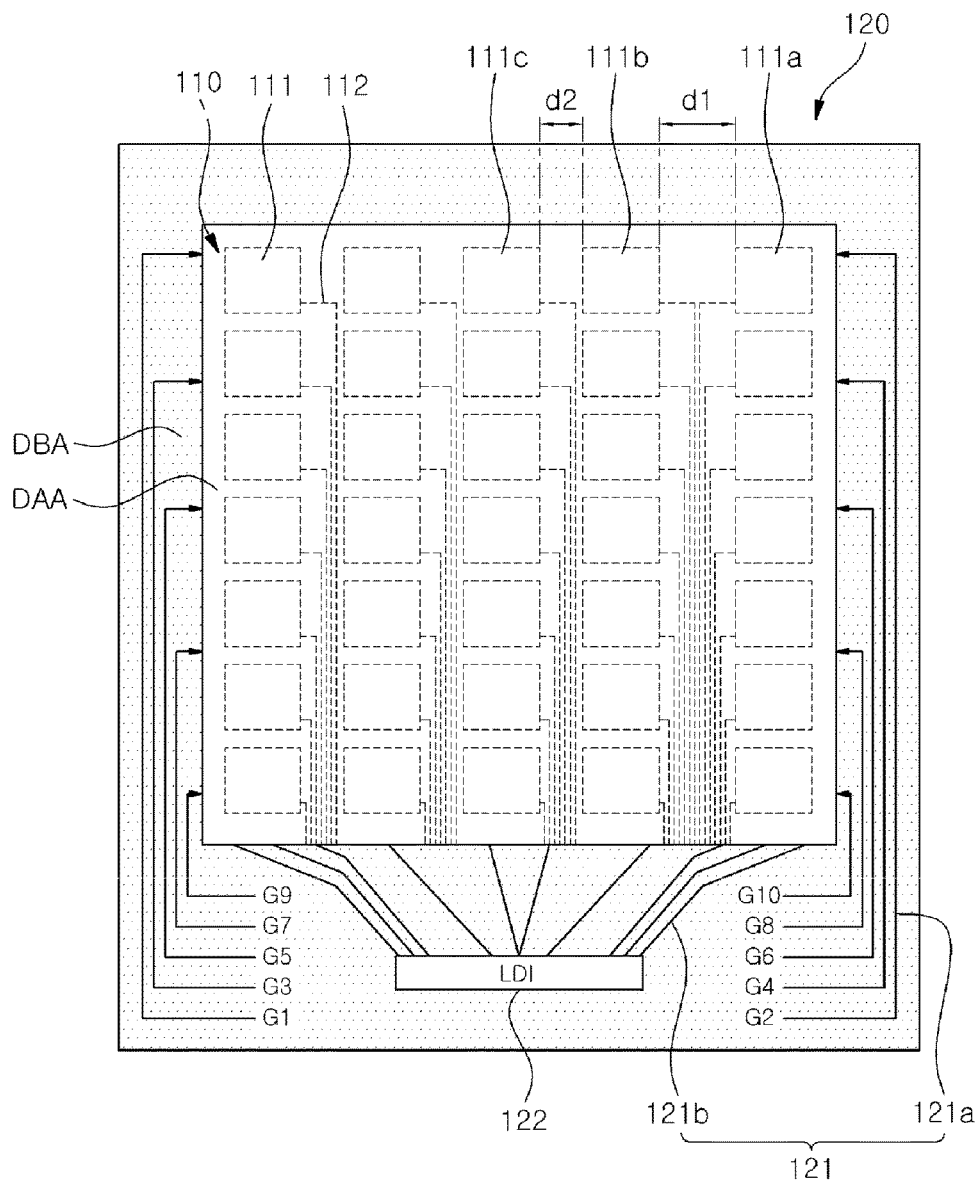

Therefore, as illustrated in FIG. 9, each touch pad 111 and each touch signal line 112 are patterned on the DAA area of the TFT substrate 120, and the touch signal lines 112 which are signal-connected to each touch pad 111 are patterned to be drawn out in the right direction and the touch signal lines 112 which are signal-connected to the touch pads 111 disposed at the rightmost end are patterned to be drawn out in the left direction, thereby preparing the uniform touch input condition at the left end and the right end.

In this case, however, as illustrated in FIG. 9, since all the touch signal lines 112 extending by being drawn out between the touch pads 111a disposed at the rightmost end and the touch pads 111b disposed to be adjacent thereto are disposed between the touch pads 111a and the touch pads 111b, a distance d1 is larger than a distance d2 spaced in a horizontal direction of other touch pads 111c and 111b, and as a result, a touch input blank occurs between the two touch pads 111a and 111b, thereby causing the phenomenon that the entire touch area of the touch panel 110 is not uniform.

Therefore, the touch panel 110 according to the exemplary embodiment of the present invention has the structure in which each touch pad 111 and each touch signal line 112 are patterned within the DAA area of the TFT substrate 120 and the distances in the horizontal direction between the respective touch pads 111 may be equal.

To this end, as illustrated in FIG. 10, the plurality of touch pads 111 are patterned within the DAA area of the TFT substrate 120 in a form in which a plurality of columns and a plurality of rows are spaced from each other at a predetermined distance and each touch signal line 112 is patterned within the DAA area in a form in which the touch signal lines extend in the direction in which the touch drive IC is disposed from each touch pad 111.

Further, each touch signal line 112 of the two touch pad columns C1 and C8 which are disposed the outermost side among all the columns of the touch pad 111 are drawn out in inner side directions from each touch pad 111 to be toward a center of the touch panel 110 and then extends in the direction in which the touch drive IC is disposed.

Further, each touch signal line 112 of each of the touch pad columns C2 to C7 disposed between the two outermost touch pad columns C1 and C8 is drawn out by being divided into both directions within the corresponding touch pad column to extend in the direction in which the touch drive IC is disposed and each touch signal 112 is patterned in the form in which the number of touch signal lines 112 drawn out in one direction within the corresponding touch pad column is increased and the number of touch signal lines 112 drawn out in the other direction is reduced, from the outermost touch pad column C1 which is any one of the two outermost touch pad columns C1 and C8 toward the other outermost touch pad column C8, thereby making the horizontal distance between each of the touch pad columns C1 to C8 equal.

Describing in more detail, as illustrated in FIG. 10, all of the touch signal lines 112 of the first touch pad column C1 are drawn out from the right direction of each touch pad 111 and thus extend downward toward the touch drive IC and only the touch signal line 112 of the touch pad 111 corresponding to a first touch pad row R1 in the second touch pad column C2 is drawn out in the left direction and all the touch signal lines 112 of the touch pad 111 corresponding to the rest of the touch pad rows R2 to R7 are drawn out in the right direction.

Further, the touch signal lines 112 of the touch pad 111 from the third touch pad column C3 to the seventh touch pad column C7 are patterned in a form in which the number of touch signal lines 112 is increased and the number of touch signal lines 112 drawn out in the right direction is reduced, toward the right direction. Therefore, all the touch signal lines 112 of the touch pad 111 of the final touch pad column C may be drawn out in the left direction.

According to the patterning structure of the touch signal line 112, the number of touch signal lines 112 drawn out to the space between the respective touch pad columns C1 to C8 is equal and therefore the horizontal distance between the respective touch pads 111 may be maintained to be equal.

Next, in the display apparatus 100 according to the exemplary embodiment of the present invention, each of the signal lines 121 and 112 are patterned by controlling an extending angle of each of the signal lines 121 and 112 so that the TFT signal line 121 of the TFT substrate 120 and the touch signal line 112 of the touch panel 110 are not opposite to each other, and thus each of the signal lines 121 and 112 may be provided not to be opposite to each other.

Figure 11:
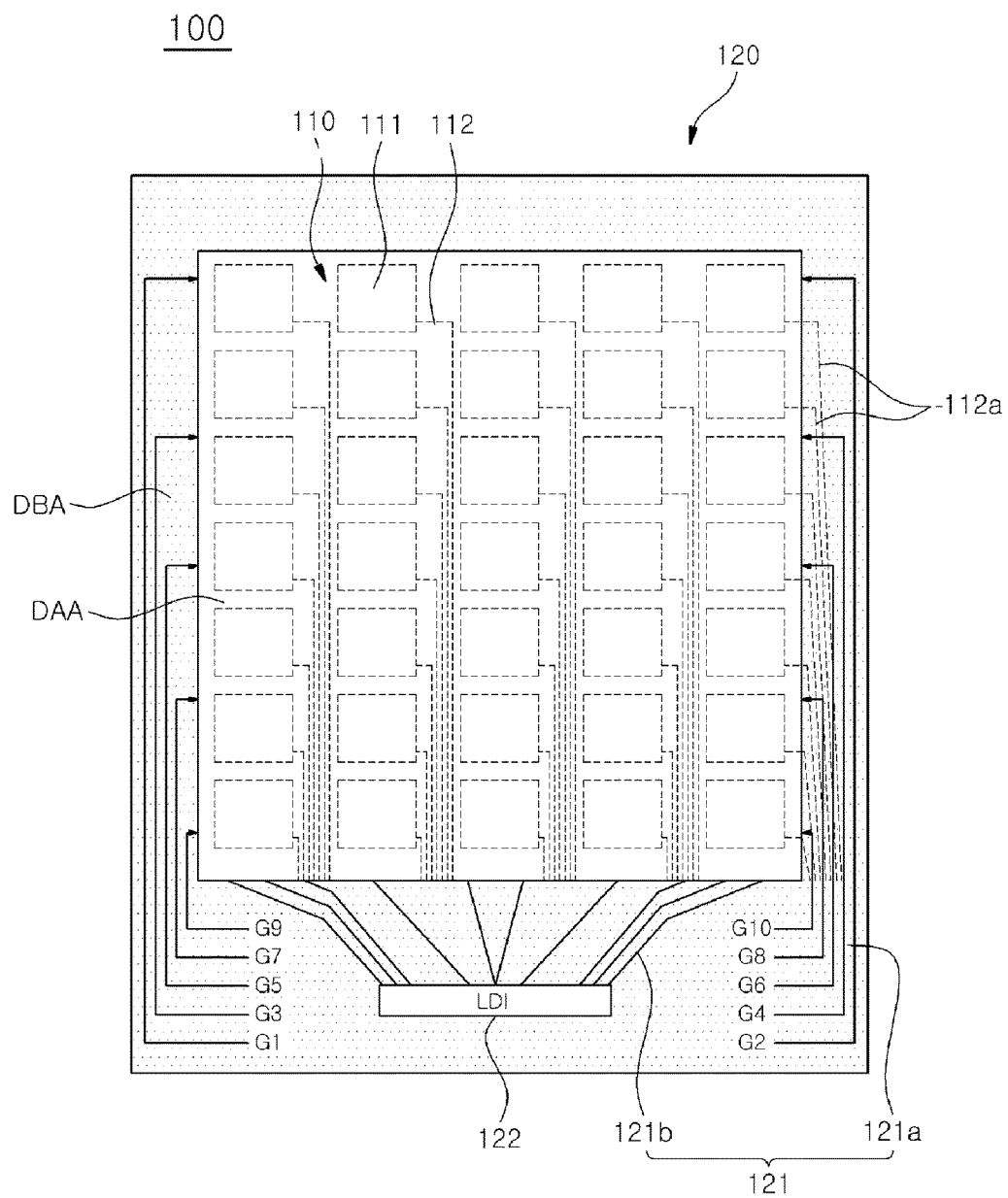
FIG. 11 is a diagram schematically illustrating a state in which the touch signal line according to the exemplary embodiment of the present invention is patterned to be inclined at a predetermined angle with respect to the TFT signal line.
Figure 14A:
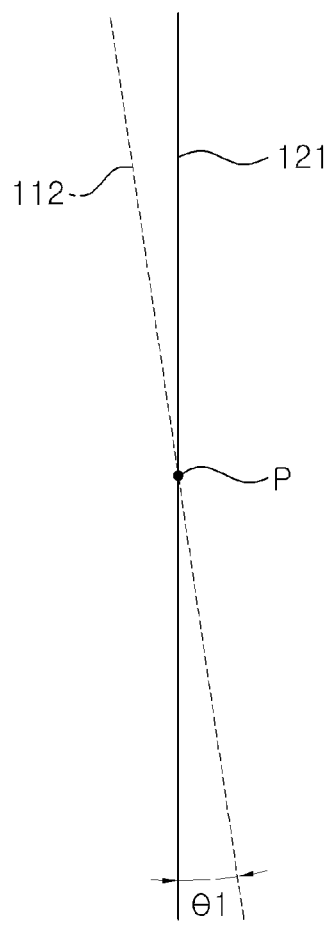
FIGS. 14A and 14B are diagrams schematically illustrating a state in which the touch signal line according to the exemplary embodiment of the present invention is patterned while being bent with respect to the TFT signal line at a predetermined angle or in a zigzag form.

To this end, as illustrated in FIGS. 11 and 14A, the touch signal lines 112 of the touch panel 110 are drawn out laterally from each touch pad 111 to extend in the direction in which the touch driver IC is disposed and the touch signal line 112 including the gate signal line 121a and the source signal line 121b of the TFT substrate 120 among the respective touch signal lines 112 is disposed and the touch signal line 112a disposed on the DRA area without the pixel may be patterned by extending toward the touch drive IC in the form in which it is inclined at a predetermined angle θ with respect to the TFT signal line 121.

For example, as illustrated in FIG. 11, when the gate signal line 121a is straightly disposed (90° with respect to a horizontal line) from the upper part of the TFT substrate 120 toward the lower part, the touch signal line 112a disposed on the DBA in which the gate signal line 121a is disposed is disposed at 85° or 95° with respect to the horizontal line.

Therefore, there is a disadvantage in that the DBA in which the gate signal line 121a is disposed may be wide, but when the touch signal line 112 uses the DAA area and the DBA together, the width of the DBA may be minimized.

An opposing angle of the gate signal line 121a and the touch signal line 112 may preferably range from ±0.1° to ±45°. Further, the plan to make the opposite area of the touch signal line 112 and the source signal line 121b small is the same concept as disposing the touch signal 112 and the source signal line at a predetermined angle, in which the mutually opposing angle may preferably range from ±0.1° to ±90°.

Figure 12:
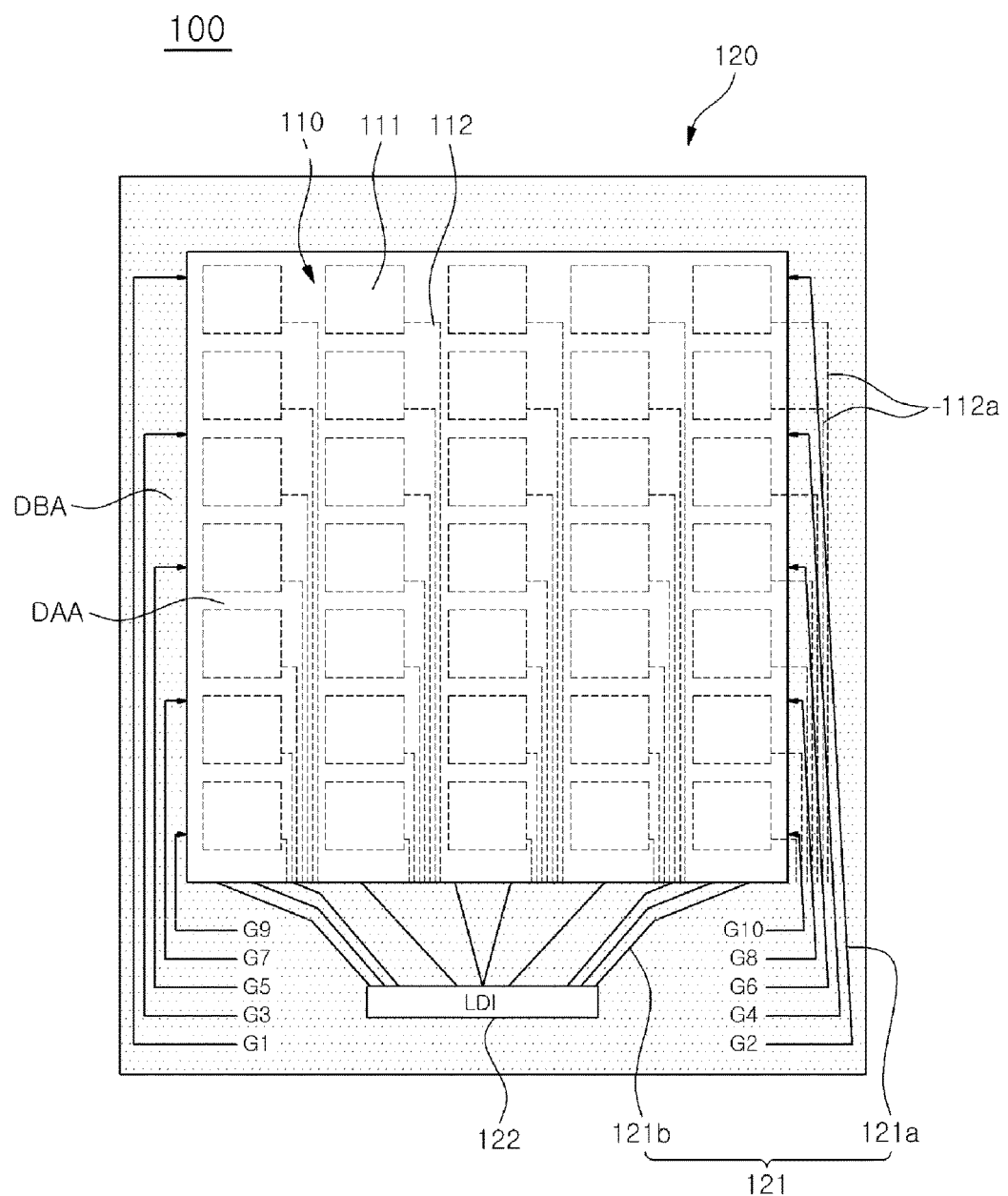
FIG. 12 is a diagram schematically illustrating a state in which the TFT signal line according to the exemplary embodiment of the present invention is patterned to be inclined at a predetermined angle with respect to the touch signal line.
Figure 15A:
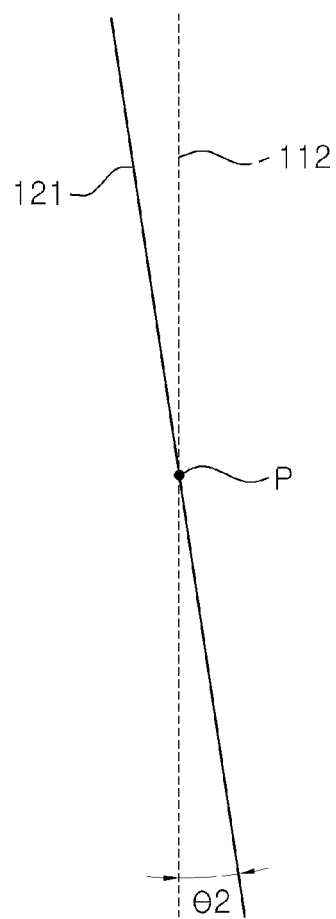
FIGS. 15A and 15B are diagrams schematically illustrating a state in which the TFT signal line according to the exemplary embodiment of the present invention is patterned while being bent with respect to the touch signal line at the predetermined angle or in the zigzag form.

Further, as illustrated in FIGS. 12 and 15A, the touch signal line 112 is maintained in the state in which it extends vertically. When some of the respective touch signal lines 112 are disposed on the DBA of the TFT substrate 120, the TFT signal line 121 of the TFT substrate 120 patterned within the DBA may be patterned while extending in the form in which it is inclined at a predetermined angle θ2 with respect to the touch signal line 112a.

Here, the predetermined angle θ2 of the TFT signal line 121 is the same concept as the predetermined inclined angle θ1 of the touch signal line 112 as described above and therefore the overlapping description thereof will be omitted.

Figure 13:
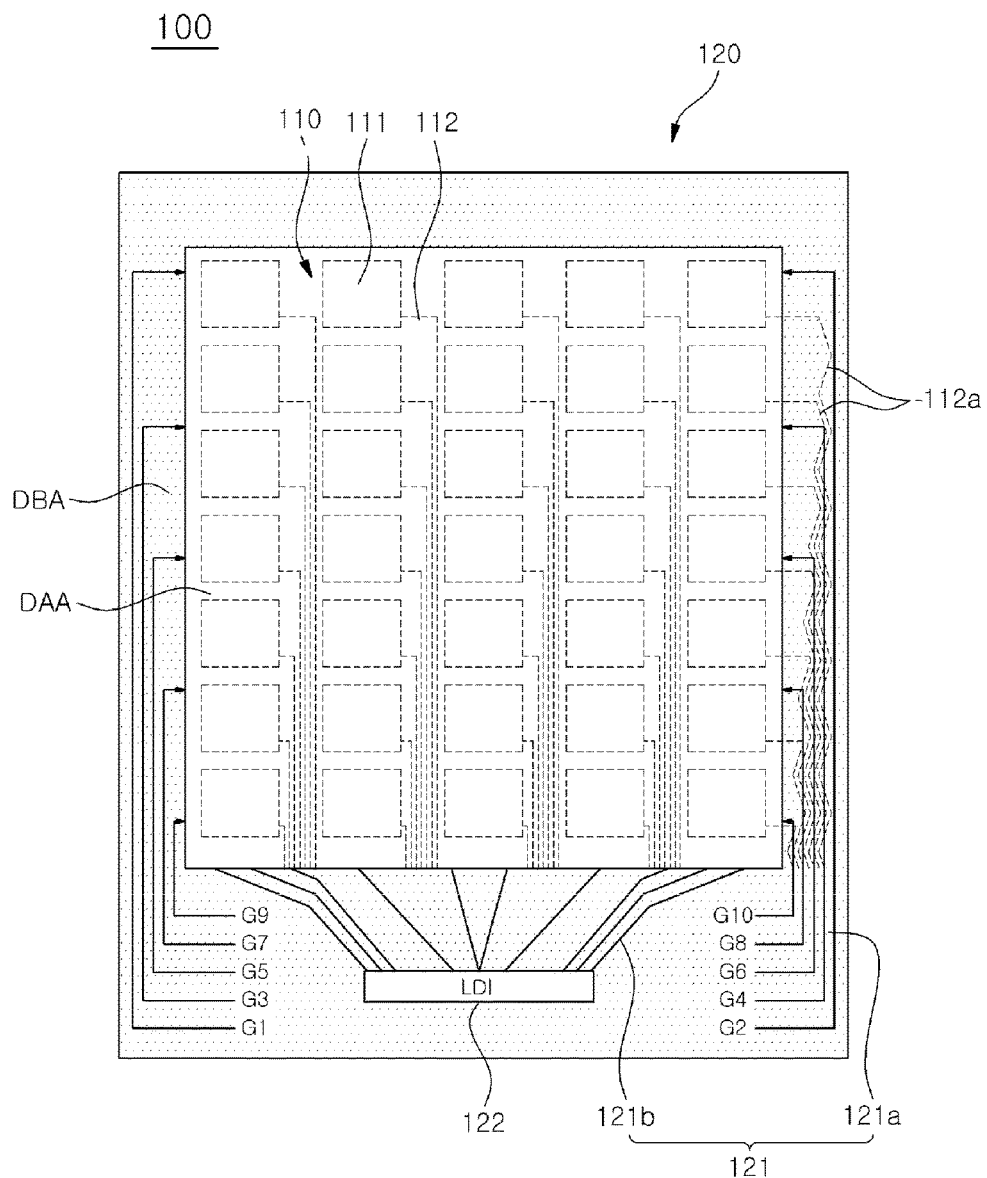
FIG. 13 is a diagram schematically illustrating a state in which the touch signal line according to the exemplary embodiment of the present invention is patterned while being bent with respect to the TFT signal line in a zigzag form.
Figure 14B:
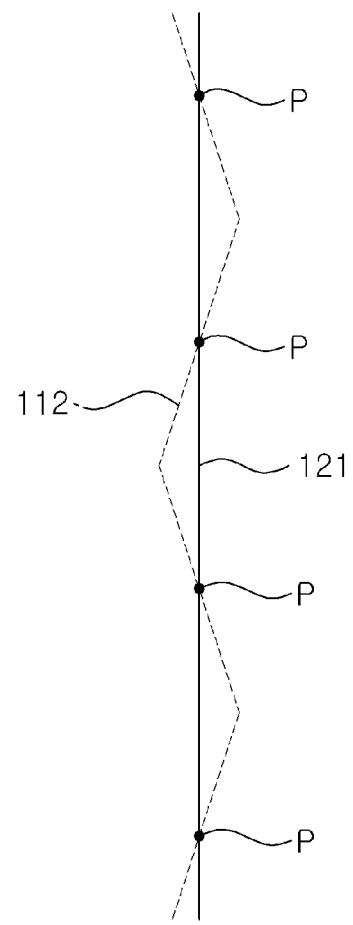

Further, in addition to the method of patterning the touch signal line 112 or the TFT signal line 121 to make the touch signal line 112 or the TFT signal line 121 be inclined at the predetermined angle, as illustrated in FIGS. 13 and 14B, the touch signal line 112a disposed on the DBA of the TFT substrate 120 among the respective touch signal lines 112 may be patterned by extending toward the touch drive IC in the zigzag form while being bent in plural times with respect to the TFT signal line 121.

Figure 15B:
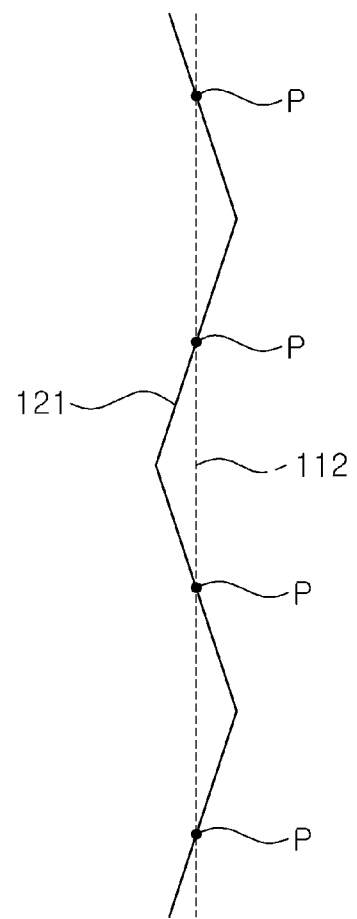

Further, as illustrated in FIG. 15B, the touch signal line 112 is maintained in the state in which it extends vertically. When some 112a of the respective touch signal lines 112 are disposed on the DBA of the TFT substrate 120, the TFT signal line 121 patterned within the DBA may be patterned by extending in the zigzag form while being bent plural times with respect to the touch signal line 112a, thereby preventing the respective signal lines 121 and 112 from being disposed to be vertically opposite to each other.

That is, the touch signal lines 112 of the touch panel 110 is limitedly patterned only on the DAA area of the TFT substrate 120, and thus when some of the touch signal lines 112a are disposed on the DBA of the TFT substrate 120, the corresponding touch signal line 112 or the TFT signal line 121 are patterned by being bent in the mutually inclined form or the zigzag form, such that only a portion P (see FIGS. 14 and 15) where the respective signal lines 121 and 112 vertically intersect with each other is limitedly overlaps and other portions are not vertically opposite to each other, thereby minimizing the overlapping area.

Meanwhile, FIG. 10 illustrates a configuration of the touch panel 110 according to the exemplary embodiment of the present invention. Referring to FIG. 10, to transmit the touch signal detected by the touch pad 111 to the touch drive IC through the touch signal line 112, each touch signal line 112 needs to be electrically connected to the touch drive IC. To this end, as illustrated in FIG. 10, ends of each of the touch signal lines 112 are provided with bonding pads 115 which are individually connected to connection terminals of the touch drive IC.

Here, when the touch pad 111 and the touch signal line 112 are made of metallic materials having excellent electric conductivity such as copper (Cu) and silver (Ag), the transmissibility of the touch signal transmitted to the touch drive IC may be increased due to the high conductivity but since the metallic materials as described above are materials identified with the naked eyes, image visibility of the display apparatus 100 in which the touch panel 110 is mounted may be reduced.

Therefore, the touch pad 111 and the touch signal line 112 of the touch panel 110 according to the exemplary embodiment of the present invention are made of the transparent conductor such as the indium tin oxide (ITO) material having a high resistance value and therefore the image output from the display panel 130 of the display apparatus 100 is not covered with the touch pad 111 and the touch signal line 112 but is transmitted as it is to be displayed to the outside, thereby preventing the image visibility from being reduced.

Here, when the touch pad 111 and the touch signal line 112 are made of the transparent conductor such as the indium tin oxide (ITO) material, as illustrated in FIG. 16A, the touch pad 111 and the touch signal line 112 according to the exemplary embodiment of the present invention are formed in one sheet of mask form made of the transparent conductor such as the indium tin oxide (ITO) material and thus may be formed in an integrated type without a joint.

That is, the ITO plate made of the transparent conductor such as an indium tin oxide (ITO) material is cut as the shape in which the touch pad 111 and the touch signal line 112 are integrally bonded to each other, and thus the touch pad 111 and the touch signal line 112 may be formed in an integrated type without the joint, such that the touch pad 111 and the touch signal line 112 may be manufactured at a time without the bonding process such as the welding for bonding between the touch pad 111 and the touch signal line 112 to be electrically connected, compared with the case in which the touch pad 111 and the touch signal line 112 are each formed in the independent mask form, thereby simplifying the process and saving the manufacturing costs.

Further, as illustrated in FIG. 10, one side of the position of the end of the touch signal line 112 on the touch substrate 113 is connected to one touch signal line 112 and the other side thereof may be provided with the bonding pad 114 which are individually connected to one of the plurality of connection terminals disposed in the touch drive IC to input the transferred touch signal to the touch drive IC.

Here, the bonding pad 114 is made of the conductor material having excellent electric conductivity. More preferably, as illustrated in FIG. 16B, the bonding pad 114 is formed in one sheet of mask form made of the transparent conductor such as the indium tin oxide (ITO) material together with the touch pad 111 and the touch signal line 112 and thus may be formed in the integrated type without a joint.

Therefore, comparing with the case in which the bonding pad 114 is made of the metallic material and the touch signal line 112 is made of the transparent conductor such as the ITO material, the number of masks required to manufacture the touch panel 110 is reduced and the bonding process to electrically connect between the touch signal line 112 and the bonding pad 114 is unnecessary, there by simplifying the process and more saving the manufacturing costs.

The bonding pad 114 is formed on the touch substrate 113 on which the touch pad 111 and the touch signal line 112 are patterned and transmits the touch signal detected by the touch pad 111 to the touch drive IC by a chip on the glass (COG) bonding in a structure corresponding to a COG type touch drive IC.

Further, the bonding pad 114 is mutually bonded to a bonded portion 115 which is formed on a flexible board 113 such as a flexible printed circuit (FPC) and a chip on the film (COF), etc., to transmit the touch signal to the touch drive IC (not illustrated) which is mounted on the flexible board 113 and transmit the touch signal to the touch drive IC which is present outside the flexible board 113 through the flexible board 113.

Here, when the flexible board 113 is formed of a single layer, a circuit to transmit the touch signal only to an upper surface or a lower surface of the flexible board 113 is formed, which may more save manufacturing costs than the case in which circuits are formed on both surfaces of the flexible board 113.

Further, the touch pad 111, the touch signal line 112, and the bonding pad 114 according to the exemplary embodiment of the present invention may be manufactured in one sheet of mask and therefore when the flexible board 113 is also formed on a single layer, manufacturing costs may be more saved. According to the exemplary embodiment of the present invention, when the touch pad 111, the touch signal line 112, and the bonding pad 114 are formed on the single layer, they are mutually connected to the bonded portion 115 of the flexible board 113 formed of the single layer, thereby saving manufacturing costs.

Further, even when the flexible board 113 is the multi layer, not the single layer, the touch signal line 112 and the touch pad 111 and the bonding pad 114 formed of the single layer may be bonded to the bonded portion 115 of the flexible board 113 and the bonding between the bonding pad 114 and the bonded portion 115 of the flexible board 113 may be used by the bonding method using an ACF as an example.

According to each component and function of the display apparatus 100 according to the exemplary embodiment of the present invention as described above, it is possible to minimize the signal distortion phenomenon due to the electrical effect between each of the TFT signal lines 121 of the TFT substrate 120 and each of the touch signal lines 112 of the touch panel 110, by locally patterning the touch signal lines 112 of the touch panel 110 only at the upper position of the display active area DAA in which the TFT signal lines 121 of the TFT substrate 120 are not disposed or by patterning the touch signal lines while inclining the touch signal lines 112, which are disposed in the display black-matrix area DBA in which the TFT signal lines 121 of the TFT substrate 120 are disposed, at the predetermined angle or bending the touch signal lines 112 in the zigzag form to intersect the TFT signal lines 121 with the touch signal lines 112 without allowing the TFT signal lines 121 and the touch signal lines 112 to be vertically opposite to each other, in a state in which the touch panel 110 is mounted on the upper portion of the display panel 130 including the TFT substrate 120.

As described above, the exemplary embodiments of the present invention have the following effects.

First, it is possible to minimize the signal distortion phenomenon due to the electrical effect between each of the TFT signal lines 121 of the TFT substrate 120 and each of the touch signal lines 112 of the touch panel 110, by patterning the touch signal lines 112 of the touch panel 110 only at the upper position of the display active area DAA in which the TFT signal lines 121 of the TFT substrate 120 are not disposed or by patterning the touch signal lines while inclining the touch signal lines 112, which are disposed in the display black-matrix area DBA in which the TFT signal lines 121 of the TFT substrate 120 are disposed, at the predetermined angle or bending the touch signal lines 112 in the zigzag form to intersect the TFT signal lines 121 with the touch signal lines 112 without allowing the TFT signal lines 121 and the touch signal lines 112 to be vertically opposite to each other, in a state in which the touch panel 110 is mounted on the upper part of the display panel 130 including the TFT substrate 120.

Second, when the touch signal lines 112 of the touch panel 110 are disposed on the display active area DAA in which the TFT signal lines 121 of the TFT substrate 120 are not disposed but the pixels are disposed, each of the touch signal lines 112 of the two touch pad columns C1 and C8 disposed at the outermost side among all the arrays of the touch pads 111 is drawn out to the inner side directions opposite to each other from each of the touch pads 111 to be toward the center of the touch panel 110 and thus extends in the direction in which the touch drive IC is disposed, and each of the touch signal lines 112 of each of the touch pad columns C2 to C7 disposed between the two outermost touch pad columns C1 and C8 is separately drawn out in both directions within the corresponding touch pad column and thus extends in the direction in which the touch drive IC is disposed, and the touch signal lines 112 are patterned in the form in which the number of touch signal lines 112 drawn out in one direction within the corresponding touch pad column is increased and the number of touch signal lines 112 drawn out in the other direction is reduced from the outermost touch pad column C1 which is any one of the two outermost touch pad columns C1 and C8, thereby making the distance between each of the touch pad columns C1 to C8 equal while minimizing the signal distortion phenomenon due to each of the signal lines 121 and 112 opposite to each other.

Third, the ITO plate made of the transparent conductor such as an indium tin oxide (ITO) material is cut as the shape in which the touch pad 111 and the touch signal line 112 are integrally bonded to each other, and thus the touch pad 111 and the touch signal line 112 may be formed in an integrated type without the joint, such that the touch pad 111 and the touch signal line 112 may be manufactured at a time without the bonding process such as the welding for bonding between the touch pad 111 and the touch signal line 112 to be electrically connected, compared with the case in which the touch pad 111 and the touch signal line 112 are each formed in the independent mask form, thereby simplifying the process and saving the manufacturing costs. In addition, the bonding pad 114 disposed at the end of the touch signal line 112 is also formed as one sheet of mask made of the transparent conductor such as an indium tin oxide (ITO) material together with the touch pad 111 and the touch signal line 112 and thus are formed in an integrated type without the joint, thereby more increasing the above effects.

It will be obvious to those skilled in the art to which the present invention pertains that the present invention described above is not limited to the above-mentioned exemplary embodiments and the accompanying drawings, but may be variously substituted, modified, and altered without departing from the scope and spirit of the present invention.

What is claimed is:

1. A touch panel disposed on a TFT substrate included in a display panel to detect a touch by a touch input means, the touch panel comprising:
    a touch substrate configured to be horizontally disposed on the TFT substrate;
    a plurality of touch pads configured to be patterned on the touch substrate to sense the touch so as to output touch signals; and
    touch signal lines configured to be patterned on the touch substrate in a form in which one end of the touch signal lines is connected to each touch pad and the other end thereof is connected to a touch drive IC and apply the touch signals of each touch pad to the touch drive IC,
    wherein an entire area of the TFT substrate is provided with TFT signal lines including gate signal lines and source signal lines and is divided into a display black-matrix area (DBA) without pixels and a display active area (DAA) provided with the pixels to display an image,
    wherein the touch pads and the touch signal lines are patterned only at an upper position of an area corresponding to the DAA not to be vertically opposite to the TFT signal line,
    wherein the plurality of touch pads are patterned within the DAA of the TFT substrate in a form in which a plurality of columns and a plurality of rows are spaced from each other at a predetermined distance and each touch signal line is patterned within the DAA in a form in which the touch signal lines extend in a direction in which the touch drive IC is disposed from each touch pad,
    wherein each touch signal line of two touch pad columns (C1 and C8) which are disposed at the outermost side among all the columns of the touch pads is drawn out inwardly from each touch pad toward a center of the touch panel and thus extends in a direction in which the touch drive IC is disposed, and
    wherein each touch signal line of each of the touch pad columns (C2 to C7) disposed between the two touch pad columns (C1 and C8) at the outermost side is drawn out by being divided into both directions within the corresponding touch pad column to extend in the direction in which the touch drive IC is disposed and each touch signal is patterned in a form in which the number of touch signal lines drawn out in one direction within the corresponding touch pad column is increased and the number of touch signal lines drawn out in the other direction is reduced, from the outermost touch pad column (C1) which is any one of the two touch pad columns (C1 and C8) at the outermost side toward the other outermost touch pad column (C8) to make a distance between each of the touch pad columns (C1 to C8) equal.

2. A display apparatus outputting a screen while detecting a touch by a touch input means, the display apparatus comprising:
    a display panel configured to have a TFT substrate which has an entire area provided with TFT signal lines including gate signal lines and source signal lines and is divided into a display black-matrix area (DBA) without pixels and a display active area (DAA) provided with the pixels to display an image and output a predetermined screen depending on a signal input to the TFT substrate; and
    a touch panel configured to include a touch substrate horizontally disposed on the TFT substrate, a plurality of touch pads patterned on the touch substrate to sense the touch so as to output touch signals, and touch signal lines patterned on the touch substrate in a form in which one end of the touch signal lines is connected to each touch pad and the other end thereof is connected to a touch drive IC and applying the touch signals of each touch pad to the touch drive IC,
    wherein the touch signal lines and the touch pads are patterned only at an upper position of an area corresponding to the DAA of the TFT substrate not to be vertically opposite to the TFT signal line, wherein the plurality of touch pads are patterned within the DAA of the TFT substrate in a form in which a plurality of columns and a plurality of rows are spaced from each other at a predetermined distance and each touch signal line is patterned within the DAA in a form in which the touch signal lines extend in a direction in which the touch drive IC is disposed from each touch pad, wherein each touch signal line of two touch pad columns (C1 and C8) which are disposed at the outermost side among all the columns of the touch pads is drawn out inwardly from each touch pad toward a center of the touch panel and thus extends in a direction in which the touch drive IC is disposed, and wherein each touch signal line of each of the touch pad columns (C2 to C7) disposed between the two touch pad columns (C1 and C8) at the outermost side is drawn out by being divided into both directions within the corresponding touch pad column to extend in the direction in which the touch drive IC is disposed and each touch signal is patterned in a form in which the number of touch signal lines drawn out in one direction within the corresponding touch pad column is increased and the number of touch signal lines drawn out in the other direction is reduced, from the outermost touch pad column (C1) which is any one of the two touch pad columns (C1 and C8) at the outermost side toward the other outermost touch pad column (C8) to make a distance between each of the touch pad columns (C1 to C8) equal.

* * * * *